Aug. 19, 1941.   F. EIDENEIER   2,253,455
FUEL INJECTION APPARATUS FOR INTERNAL COMBUSTION ENGINES
Filed March 21, 1939
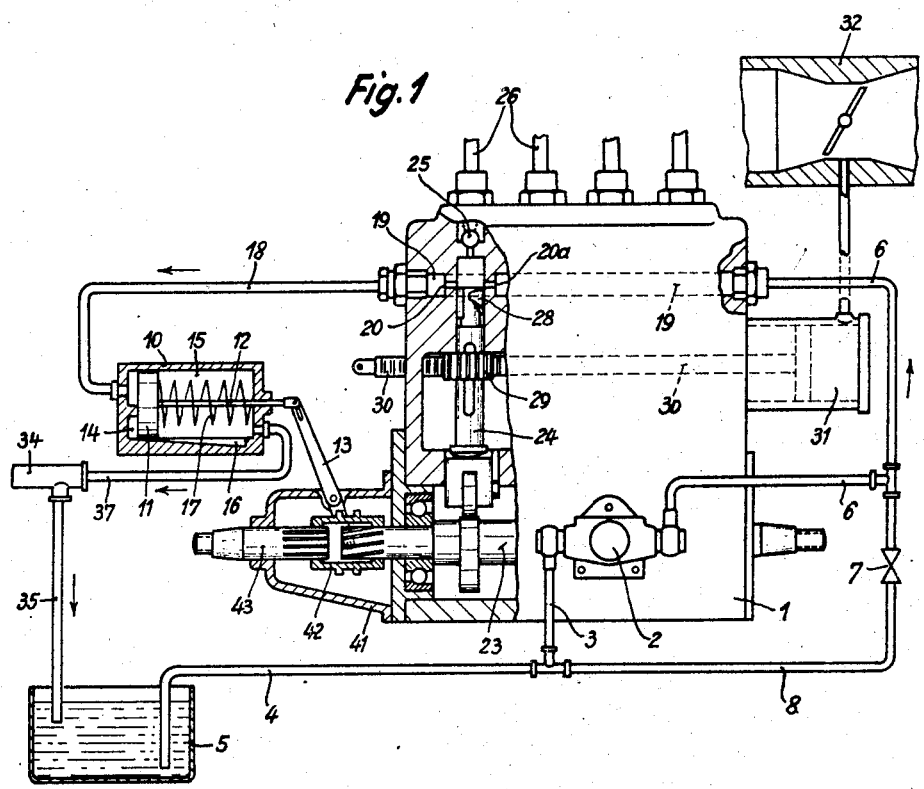

Patented Aug. 19, 1941

2,253,455

UNITED STATES PATENT OFFICE 2,253,455

FUEL INJECTION APPARATUS FOR INTERNAL COMBUSTION ENGINES

Fritz Eideneier, Stuttgart, Germany, assignor to Robert Bosch Gesellschaft mit beschränkter Haftung, Stuttgart, Germany Application March 21, 1939, Serial No. 263,249
In Germany March 30, 1938

6 Claims. (Cl. 123—139)

The present invention relates to fuel injection apparatus for Diesel and other internal combustion engines of the type wherein a feed pump whose delivery rate increases with increase of engine speed supplies fuel to an injection pump which injects merely a part of the fuel supplied thereto and wherein the uninjected fuel influences a hydraulic adjusting member for varying the timing of the injection pump.

The invention has for its object, in fuel injection apparatus of this kind, to obtain a working of the adjusting member which is quiet and free from shock at all fluctuations in engine speed and load.

According to the invention, in an apparatus of the type specified the said adjusting member is embodied in an overflow pipe through which the amounts of fuel pumped in excess by the feed-pump flow away after flowing through the inlet chamber of the injection pump.

The invention is shown by way of example in the accompanying drawing, in which:

Fig. 1 is a diagram of a fuel injection apparatus for a high speed engine, parts being shown in section.

Fig. 2 shows a detail view on an enlarged scale.

An injection pump 1 is driven (in a manner not shown) from an internal combustion engine. A fuel feed-pump 2 is attached to the injection pump, and is driven by it. The fuel is drawn from a container 5 through the suction pipe 3, 4 of the feed pump. A pressure pipe 6 leads from the feed-pump 2 to the inlet chamber 19 of the injection pump.

Furthermore, the pressure pipe 6 is connected by a safety valve 7, which does not open under normal working conditions, and a pipe 8, to the suction side of the feed-pump 2 and the fuel container 5.

From the inlet chamber 19 the fuel passes in known manner through inlet passages 20 into the cylinder chambers 21 of the injection pump. At each revolution of the cam-shaft 23 of the injection pump, its pump pistons 24 are moved up and down once. As soon as the inlet passages 20 and the return flow passages 20a, situated opposite thereto, are closed at each upstroke by the pump pistons, the fuel enclosed in the cylinder chamber is compressed and is forced through pressure valves 25 and pipes 26 to the injection nozzles (not shown) of the internal combustion engine. The feed to the nozzles ceases as soon as the controlling face 28 of the piston provided below with an oblique controlling edge 27 (Fig. 4) begins to open the return flow passage 20a. This opening takes place even during the upstroke, and in fact, in dependence on the length of that part of the controlling face 28 which is opposed to the return flow passage 20a by the turning of the piston. The turning or angular movement of the piston is effected by a spur-wheel 29, which is secured to the piston so as to be longitudinally displaceable, and can be rotated by a toothed controlling-bar 30. In the example of construction shown, the controlling-bar 30, mounted so as to be longitudinally displaceable in the casing of the injection pump, is moved by a pneumatic governor 31, which responds to the induction air conditions in the induction pipe 32 of the engine, which vary in dependence on the speed of the engine and the position of a throttle valve adjustable at will by the driver.

Just as the end of the effective pumping stroke of the injection pump is altered by the lower oblique edge 27 of the controlling face 28 on rotating the pump piston, so the beginning of the pumping, that is to say, the beginning of the injection, can be determined by the upper oblique edge 33. The oblique edge 33 is so constructed in the example of construction shown in Fig. 2 that with the adjustment for larger injection amounts as the load on the engine increases, the beginning of the injection is somewhat advanced. In this case, the slope of the edge 33 is determined according to whether, and in some cases to what extent, in the internal combustion engine in question for which the injection pump is intended, an alteration of the beginning of the injection in dependence on the load is desired.

Insofar as the fuel delivered by the feed-pump 2 is not consumed by the injection pump 1, it passes through a pipe 18 into a cylinder 10. A piston 11 is guided in the cylinder 10, and is connected by a piston-rod 12 to a lever 13. The piston 11 divides the internal space in the cylinder 10 into two chambers 14 and 15, which are connected together simply by a slot 16 provided in the cylinder wall. The cross section of the slot 16 increases from one end of the cylinder to the other end. In the chamber 15 a spring 17 is arranged, which tends to force the piston towards the left in Fig. 1.

The chamber 15 is connected by a pipe 37 and a valve 34 to a pipe 35 which leads back to the fuel tank 5. The valve 34 prevents the chamber 15 from becoming empty, and is so constructed that it opens and gives a comparatively large passage cross section even on a slight excess pressure in the chamber 15. In this way, even if large quantities of returning fuel enter the chamber 15 an appreciable increase in pressure can never occur. Instead of the arrangement of the valve, the pipe 37 could also start from the upper part of the chamber 15, in order to prevent this chamber from running empty. The impact of fuel on both sides of the piston 11 acts to absorb shock, so that the piston works considerably more quietly than pistons acted upon on one side only.

The lever 13 is pivoted in a part 41 of the casing of the injection pump, and engages with its lower arm in fork fashion with a coupling sleeve 42, engaging with internal teeth in external teeth provided at the end of a shaft 43 coupled to the engine, and at the adjacent end of the cam-shaft 23. The teeth on the end of the cam-shaft and on the right hand part of the sleeve 42 are made as oblique teeth of such direction that, on the displacement of the sleeve to the left in Fig. 1, the cam-shaft is rotated somewhat in its running direction, so that thereby a corresponding advance of the injection stroke is produced.

The delivery of the feed-pump 2 driven by the engine increases with increase of engine speed. With the same load on the engine, the fuel consumption of the injection pump at each stroke does not alter considerably on alterations in speed. With the load remaining the same, but the speed variable, greater quantities of fuel therefore pass through the pipe 18 into the chamber 14 the higher the engine speed, and vice versa. While at low speeds the small amounts of fuel reaching the chamber 14 can flow into the chamber 15 through the left narrow part of the groove 16, the larger amounts of fuel move the piston 11 serving as adjusting member towards the right in Fig. 1, and thereby open a wider cross section to the stream of fuel flowing through as the speed rises. By this means, the injection adjusting lever 13 is turned in the clockwise direction and thus by rotating the cam-shaft 23 forward the injection pump is adjusted for an earlier beginning of the injection to correspond to the higher speed.

With the speed remaining the same and the load on the engine variable, the amount of fuel pumped by the feed-pump 2 does not alter, but the amount of fuel consumed by the injection pump and pumped to the injection nozzles of the engine certainly does. Also in this case the overflow amounts flowing through the pipe 18 into the chamber 14 vary. These amounts are so much the greater the smaller the load on the engine. Thus with a decreasing load the amounts of fuel reaching the chamber 14 become greater. This has for its consequence that, as the load declines, the piston 11 moves towards the right in Fig. 1, and the cam-shaft 23 is rotated forward in the running direction so as to advance the beginning of the injection.

For internal combustion engines in which an advance of the beginning of the injection with a decreasing load is not desired, or not desired in the degree given by the arrangement of the groove 16, the advance of the beginning of the injection produced by the groove 16 with a decreasing load can be altered as desired by suitably choosing the pitch of the oblique edge 33, and even converted in some circumstances into an advance of the beginning of injection taking place as the load increases. This is possible, because with the adjustment of the engine to another load, not only is the piston 11 adjusted, but at the same time also the oblique edge 33, which also influences the beginning of the injection is rotated. In the example of construction illustrated, the pitch of the helical line in the oblique edge 33 is so chosen that, with a greater load, the passage 20a is closed earlier during the upstroke of the pump piston 24 than with a smaller load; the oblique edge 33 thus causes in this case an advance of the beginning of the injection with an increasing load, and therefore counteracts the retarding of the beginning of the injection caused by the adjusting member with an increasing load. According to whether the oblique edge 33 is made with only a quite slow pitch or with a quick pitch, the influence of the load on the adjusting member 11 and the beginning of the injection can thus be partly or entirely nullified, or for suitably constructed internal combustion engines such a steep pitch of the oblique edge 33 can even be chosen that an advance of the beginning of the injection results on an increase in load, although the adjusting member 11 by itself alone adjusts the cam-shaft 23 to give a retarding of the beginning of the injection on an increase in load. All these adjustments of the beginning of the injection dependent on load take place in addition to those adjustments that are necessitated by alterations in speed and which always take place in the sense that, with increasing speed, an advance of the beginning of the injection corresponding to the increase in speed is brought about.

I declare that what I claim is:

1. In a hydraulic governing system for an internal combustion engine having a fuel injection pump provided with a cam-shaft, means for driving said cam-shaft from said engine, a fuel feed pump, driven by said engine, for supplying fuel to said injection pump in excess of its requirements, means for controlling overflow of fuel from said injection pump in response to variations of engine load and a coupling for varying the timed relationship between said camshaft and its driving means; the combination of means for causing said coupling to vary said timed relationship in response to changes in the amount of overflow from the injection pump, said means comprising a cylinder into one end of which said overflow is discharged and through which said overflow passes, a double-acting piston disposed in said cylinder and responsive to flow of fuel through said cylinder, a restricted by-pass permitting flow of fuel past said piston from end to end of said cylinder, an outlet for said cylinder arranged to keep said cylinder substantially filled with fuel.

2. In a hydraulic governing system for an internal combustion engine having a fuel injection pump provided with a fuel inlet chamber, a plurality of pumping pistons driven by a common cam-shaft and means for driving said cam-shaft from said engine, a coupling for varying the timed relationship between said cam-shaft and its driving means, a fuel supply container, a fuel supply pipe leading from said container to said inlet chamber of the injection pump, a fuel feed pump in said supply pipe and driven by said engine, said fuel feed pump delivering with increasing speed increasing fuel amounts from said container into said inlet chamber in excess of the requirements of said injection pump, and an overflow pipe, the combination of a casing, a movable control member by which said casing is divided into two chambers, a restricted by-pass by which the first chamber of said casing is connected with the second chamber, said inlet chamber of the injection pump being connected by said overflow pipe with the first chamber of said casing, an overflow valve being connected with the other chamber of said casing and keeping the pressure in said other chamber substantially constant, said movable control member being connected with said coupling whereby with increasing pressure in the first chamber of said casing the coupling is displaced so as to advance the injection time, and resilient means displacing said control member and said coupling in the opposite direction when the pressure decreases.

3. In a hydraulic governing system for an internal combustion engine having means for periodically supplying fuel to the engine cylinders in timed relation to the engine crank shaft, a source of fuel, conduit means connecting said source and said fuel supplying means, means for circulating fuel in said conduit means from said source to said fuel supplying means and back to said source at a rate varying as a function of the speed of said engine whereby fuel is delivered to said fuel supplying means in excess of its requirements and excess fuel returned to said source, the combination of control means arranged in said conduit means and through which excess fuel flows from said fuel supply means, said control means including a casing through which said excess fuel flows and a movable member in said casing, said casing cooperating with said movable member to provide restricted by-pass means to permit flow of fuel past said member from end to end of said casing but said member interposing a resistance to said flow whereby said member will be movable by and responsive to variations in the rate of flow of such excess fuel, means responsive to movement of said member for effecting changes in the time of the fuel supply period, and an overflow valve in said conduit means between said control means and said source for keeping said casing substantially filled with fuel and for maintaining the fuel pressure at the outlet of said casing substantially constant.

4. In a hydraulic governing system for an internal combustion engine having means for periodically supplying motive fluid to the engine cylinders in timed relation to the engine crank shaft, a source of motive fluid, conduit means connecting said source and said motive fluid supplying means, and means for circulating motive fluid in said conduit means from said source to said motive fluid supplying means and back to said source at a rate varying as a function of the speed of said engine whereby motive fluid is delivered to said motive fluid supplying means in excess of its requirements and excess motive fluid is returned to said source, the combination of control means arranged in said conduit means and through which excess motive fluid flows from said motive fluid supply means, said control means including a cylinder through which said excess motive fluid flows and a movable piston in said cylinder, said cylinder being provided with restricted by-pass means co-operating with said piston to permit flow of motive fluid past said piston from end to end of said cylinder but said piston interposing a resistance to said flow whereby said piston will be movable by and responsive to variations in the rate of flow of such excess motive fluid, means responsive to movement of said piston for effecting changes in the time of the motive fluid supply period, and an overflow valve in said conduit means between said control means and said source for keeping said cylinder substantially filled with motive fluid and for maintaining the fluid pressure at the outlet of said cylinder substantially constant.

5. In a hydraulic governing system as set out in claim 4 in which the cross-sectional area of said restricted by-pass varies with movement of said piston.

6. In a hydraulic governing system as set out in claim 4 in which the restricted by-pass comprises a groove formed in the interior wall of said cylinder and extending longitudinally from end to end thereof, said groove gradually increasing in cross-section from end to end.

FRITZ EIDENEIER.